United States Patent
Spinks

(10) Patent No.: US 11,680,617 B2
(45) Date of Patent: Jun. 20, 2023

(54) RESILIENT UNIT

(75) Inventor: Simon Paul Spinks, Cawood (GB)

(73) Assignee: HS PRODUCTS LTD, Leeds (GB)

(*) Notice: Subject to any disclaimer, the term of this patent is extended or adjusted under 35 U.S.C. 154(b) by 0 days.

(21) Appl. No.: 13/983,816

(22) PCT Filed: Feb. 9, 2012

(86) PCT No.: PCT/GB2012/050285
§ 371 (c)(1),
(2), (4) Date: Sep. 6, 2013

(87) PCT Pub. No.: WO2012/107767
PCT Pub. Date: Aug. 16, 2012

(65) Prior Publication Data
US 2013/0334747 A1 Dec. 19, 2013

(30) Foreign Application Priority Data
Feb. 9, 2011 (GB) .................................. 1102187

(51) Int. Cl.
*F16F 3/04* (2006.01)
*A47C 27/06* (2006.01)

(52) U.S. Cl.
CPC .............. *F16F 3/04* (2013.01); *A47C 27/064* (2013.01); *Y10T 29/49613* (2015.01)

(58) Field of Classification Search
CPC ..... A47C 27/064; A47C 25/00; A47C 27/065; F16F 3/04; Y10T 29/49613; B68G 9/00
See application file for complete search history.

(56) References Cited

U.S. PATENT DOCUMENTS

| | | | | |
|---|---|---|---|---|
| 380,651 A * | 4/1888 | Fowler et al. | ............. | 267/166.1 |
| 1,087,248 A * | 2/1914 | Lewis | ............... | 267/93 |
| 1,250,892 A * | 12/1917 | Johnson | ............ | 5/720 |
| 2,148,961 A * | 2/1939 | Pleet | ................ | 267/91 |
| 3,462,779 A * | 8/1969 | Thompson | ..................... | 5/655.8 |
| 4,003,563 A * | 1/1977 | Taylor | ............... | 267/100 |
| 4,038,711 A * | 8/1977 | Golembeck et al. | ............. | 5/263 |
| 4,111,407 A * | 9/1978 | Stager | ......... | 267/166.1 |

(Continued)

FOREIGN PATENT DOCUMENTS

EP 2105069 A1 9/2009
EP 1993947 B1 3/2014

(Continued)

OTHER PUBLICATIONS

International Search Report and Written Opinion dated May 25, 2012 in connection with International Patent Appln. No. PCT/GB2012/050285 filed on Feb. 9, 2012, 8 pages.

(Continued)

*Primary Examiner* — Xuan Lan Nguyen
(74) *Attorney, Agent, or Firm* — Gesmer Updegrove LLP

(57) ABSTRACT

A resilient unit suitable for providing comfort, convenience, support or protection is described. The unit typically takes the form of a pad comprising a plurality of pocketed coil springs arranged in an array, each spring being substantially encased in an individual pocket, and the unit being compressible in the axial direction of the springs, wherein each spring comprises a number of coils, and in respect of at least some springs the coils at opposed ends are of different diameter.

24 Claims, 2 Drawing Sheets

(56) References Cited

U.S. PATENT DOCUMENTS

| | | | | |
|---|---|---|---|---|
| 4,485,506 A * | 12/1984 | Stumpf et al. | ............... | 5/655.8 |
| 6,131,892 A * | 10/2000 | Stumpf | ....................... | 267/91 |
| 6,170,807 B1 * | 1/2001 | Eto | ........................... | 267/103 |
| 6,490,744 B1 * | 12/2002 | Schulz, Jr. | .................... | 5/720 |
| 6,931,685 B2 * | 8/2005 | Kuchel et al. | ................ | 5/716 |
| 2004/0128773 A1 * | 7/2004 | Barber | ......................... | 5/716 |
| 2005/0055778 A1 | 3/2005 | Kuchel | | |

FOREIGN PATENT DOCUMENTS

| | | | | |
|---|---|---|---|---|
| FR | 2932658 A1 | 12/2009 | | |
| WO | WO-2005085123 A1 * | 9/2005 | ........... | A47C 27/064 |
| WO | 2006043862 A1 | 4/2006 | | |
| WO | 2007031774 A1 | 3/2007 | | |
| WO | WO 2009129536 A1 * | 10/2009 | ............. | A47C 23/04 |

OTHER PUBLICATIONS

International Preliminary Report on Patentability dated Aug. 13, 2013 in connection with International Application PCT/GB2012/050285 filed on Feb. 9, 2012, 4 pages.

\* cited by examiner

RESILIENT UNIT

PRIORITY INFORMATION

The present invention is a U.S. National Stage filing under 35 U.S.C. 371(c) of International Application No. PCT/GB2012/050285 filed Feb. 9, 2012, which claims priority to United Kingdom Patent Application No. 1102187.0, filed on Feb. 9, 2011, all of which are incorporated herein by reference in their entireties.

BACKGROUND

The present invention relates to a multi-purpose resilient unit in which the resilience is provided at least in part by a plurality of pocketed springs.

The unit may typically be in the form of a pad or panel and may be used in various applications, in particular where resilience is needed for comfort, convenience, support or protection.

Resilient pads are used in many applications to provide comfort, convenience, support and/or protection, for example to a person or object resting on, or wearing or using an article. Such pads are used, for example, in seats such as chairs or vehicle seats, in beds or tables, in mats such as exercise mats, and in special packaging. In many cases resilient pads include foam components to provide the resilience. In particular, high-density, man-made foams, such as polyurethane foams, are useful as they become deformed under pressure, but regain their shape after use.

The ability to deform can provide comfort, for example in a seat, or can absorb energy from an impact, to provide protection, for example in a helmet or other article of clothing, or in packaging.

Whilst, on the one hand, man-made foam is inexpensive and versatile, there is a long-recognised problem with its use, which is that it cannot be recycled cost effectively. Also man-made foams are typically very slow to degrade naturally.

Accordingly, various industries are actively seeking replacements for man-made foams, for use in various types of resilient pad.

SUMMARY

Embodiments of the present invention aim at least partly to address this problem. The present invention is defined in the attached independent claims to which reference should now be made. Further, preferred features may be found in the sub-claims appended thereto.

According to one aspect of the present invention there is provided a resilient unit suitable for providing comfort, convenience, support or protection, the unit comprising a plurality of pocketed coil springs arranged in an array, each spring being substantially encased in an individual pocket, and the unit being compressible in the axial direction of the springs, wherein each spring comprises a number of coils, and in respect of at least some springs the coils at opposed ends are of different diameter.

The unit is preferably in the form of a resilient pad or panel. The array may comprise a single row of springs or may comprise a plurality of rows of springs.

Preferably, in respect of at least some of the springs, the diameter of at least one of the coils is greater than the axial length of the spring in the pocket. The pockets may be formed from layers of material that are joined together at least at locations between the springs. For at least some of the springs the layers may be joined together at a position that is closer to one end of the spring than the other.

The layers may be welded together, for example ultrasonically or thermally. The weld may form a join that may be wider than it is tall, and is preferably substantially flat. In a preferred arrangement the pockets are formed from only two layers.

For at least some springs the layers of material may be joined at a position that is closer to an end of the spring having a coil of larger diameter.

Preferably substantially the same quantity of material is arranged to cover each end of the spring.

In a preferred arrangement the unit is also at least partly compressible in at least one direction transverse to the axis of the springs.

Preferably at least some of the springs are held under compression in their pockets.

The two layers of material are preferably bonded, welded or otherwise attached together at least at locations between the springs.

The springs are preferably wire and are more preferably of steel, aluminium or titanium, or of an alloy thereof.

Preferably the unit is flexible in at least one lateral direction, generally perpendicular to the axis of the springs.

The unit may include a plurality of zones in which springs from different zones have at least one different characteristic. The characteristic may be the height of the spring. Alternatively or in addition the characteristic may be the stiffness or shape of the spring.

The unit may comprise more than one layer of pocketed springs.

In a preferred arrangement the unit includes at least one additional substrate layer above or below a layer of springs and/or between layers of springs. The additional substrate layer may comprise natural material and preferably comprises one or more of: leather, hemp, wool, silk, cotton, mohair, cashmere, feather, down, and alpaca.

The invention also includes an article having at least one resilient unit according to any statement herein.

In accordance with the invention there is provided a seat comprising a resilient unit in the form of a pad according to any statement herein.

The seat may be a seat for use in relation to a vehicle, such as a wheeled vehicle, an aircraft, spacecraft or a ship or boat, or a saddle for an animal. The seat may comprise a chair, stool, bench, sofa or settee.

In accordance with another aspect there is provided a table comprising a resilient unit in the form of a pad according to any statement herein. The table may be an operating table or massage table, for example.

In accordance with a further aspect of the present invention there is provided an article of flooring comprising a resilient unit in the form of a pad according to any statement herein. The article of flooring may comprise a carpet, or carpet underlay, or a sport mat or exercise mat, or may be a leisure or sports surface either for indoor use or for outdoor use.

In accordance with a still further aspect of the invention there is provided a protective member, comprising a resilient unit according to any statement herein. The protective member may comprise an article of clothing or headgear, or may be a protective shield to be worn on the body of a user, or for attachment to an article.

According to a still further aspect of the invention there is provided an article of packaging, comprising a resilient unit in the form of a pad according to any statement herein.

The invention also provides a method of producing a resilient unit suitable for providing comfort, convenience, support or protection, the method comprising arranging a plurality of pocketed coil springs in an array, each spring being substantially encased in an individual pocket, and the unit being compressible in the axial direction of the springs, wherein each spring comprises a number of coils, and in respect of at least some springs the coils at opposed ends are of different diameter.

The method may further comprise forming the pockets from layers of material that are joined together at least at locations between the springs, wherein for at least some of the springs the layers are joined together at a position that is closer to one end of the spring than the other.

The present invention may comprise any combination of the features or limitations referred to herein, except such a combination of features as are mutually exclusive.

BRIEF DESCRIPTION OF THE DRAWINGS

Preferred embodiments of the present invention will now be described by way of example only with reference to the accompanying diagrammatic drawings in which.

DETAILED DESCRIPTION

Figure 1:
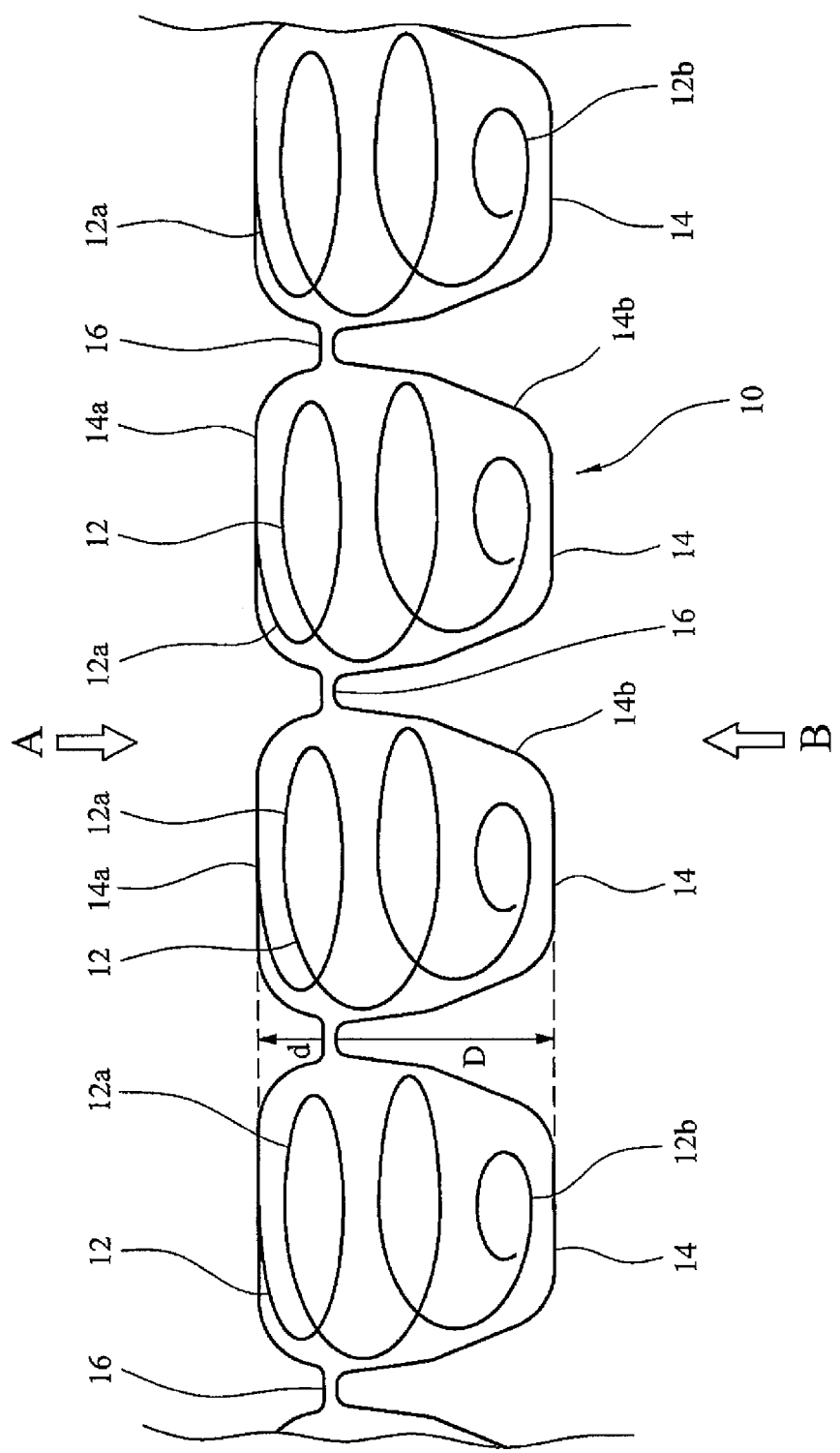
FIG. 1 shows, in schematic sectional view, a portion of a resilient unit in the form of a pad, according to an embodiment of the present invention.

Resilient pads for various uses, in accordance with embodiments of the present invention, comprise pocketed coil springs, which are sometimes referred to as encased springs. The panels typically comprise an array of metallic coil springs individually encased in pockets formed by bonding or otherwise joining together layers of material. A convenient process for manufacturing such a panel is described in our own co-pending European patent application number EP 1 993 947.

The springs are typically wider than they are tall, i.e. the diameter of at least one coil is greater than the height of the spring when in the pocket. However, in some embodiments, due to the coils at opposed ends being of different diameters and the position of the weld closer to one end of the spring than the other, the individual springs are stable and can be at least as tall as the diameter of the largest coil, and possibly taller. The pad is stable, resilient and workable. Its plan shape can be cut to suit the desired shape of the article in which it is to be used, and because of its construction it is generally flexible, both in-plane and out-of plane.

The springs can be chosen for their stiffness and size, and can be grouped into zones and combined in such a way as to provide specifically desired performance characteristics. These characteristics can be determined by the intended use of the resilient pad.

An additional substrate layer may be placed on top of the pocketed springs, or below them, or in between adjacent layers of springs to improve comfort and/or performance of the pad. The additional layer preferably comprises natural materials such as hemp, cotton or wool, to assist in the recyclability of the pad.

At least some of the springs have coils of different diameters at opposed ends. Such springs have a number of advantages over springs in which the coils at each end of the spring are of substantially the same diameter. Firstly, the springs can be compressed to a substantially flat configuration, with the smaller diameter coils lying within the larger diameter coils. If the springs can be compressed entirely within themselves, such that no touching of adjacent coils takes place, this also provides a much quieter panel than is the case when the coils repeatedly abut one another.

Furthermore, the stiffness of a wire spring can be increased by reducing coil diameter, for a given gauge of wire. Therefore a narrower gauge spring can be made which uses less material to produce the same spring stiffness. It is necessary for the spring to have at least one coil of appropriate diameter to ensure stability within the pocket, and in particular to resist any tendency for the coil to invert within the pocket, but the other coils can be made narrower. Furthermore, a spring consisting of coils which reduce in diameter has a desirable characteristic, in that its stiffness increases progressively as it is compressed.

Another, preferred feature of the invention lies in the positions where the material layers are joined, in relation to the axial height of the spring. In previously considered pocketed springs the layers of material forming the pocket were welded or otherwise bonded together either at a position half way along the axial height of the spring, or else at one end of the spring. In accordance with preferred embodiments of the present invention the joining of the layers takes place at a position closer to one end of the spring, but not at the end. More preferably, the joining takes pace closer to the end of the spring having the coil of greater diameter. The quantity of material required to cover each end of the spring may be arranged to be substantially the same.

The inventors have found that this arrangement optimises stability of the spring within the pocket.

Furthermore, when the force compressing the spring acts on the end of the spring with the greater diameter coil, the pocket of one spring affects neighbouring springs more significantly, and also at an earlier point in the compression, as compared with the situation in which the join is at a halfway position, for example.

Turning to FIG. 1, there is shown, in schematic sectional view, generally at 10 a portion of a resilient pad according to an embodiment of the present invention. The pad comprises a number of wire coil springs 12, each of which is located within its own discrete pocket 14 formed by upper and lower layers 14a and 14b of material, preferably of non-woven material. The two layers 14a and 14b have been thermally, or ultrasonically, welded together at points 16 between the adjacent springs to create the pockets.

The coil springs 12 have a generally frusto-conical shape, with, in each case, the uppermost coil 12a being of the greatest diameter, and the spring tapering to its lowermost coil 12b which is of the smallest diameter.

The position of the welds 16 is a distance d from the top of the pad, and a distance D from the bottom of the pad, with D being greater than d, and preferably the ratio d/(d+D) being in the range 0.25-0.3.

Whilst the springs in FIG. 1 are of generally frusto-conical shape they could be of other shapes, such as hour glass or barrel shape, providing that one end coil is of greater diameter than the other end coil. Of course, depending upon the application, the pad 10 may be arranged to receive a compressive force in the direction of arrow A or of arrow B, i.e. the pad 10 may be in the orientation shown in FIG. 1 or else may be inverted.

Figure 2:
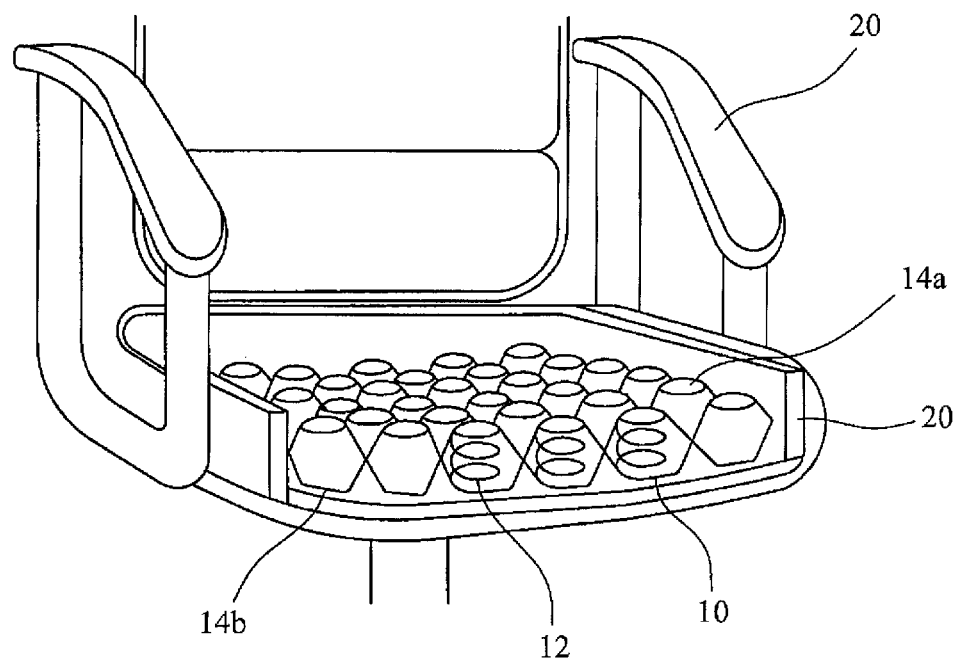
FIG. 2 shows, in schematic cutaway view, a chair base, incorporating a resilient unit in the form of a panel according to an embodiment of the present invention.

Turning to FIG. 2, this shows generally at 20 a chair having a chair base 20a comprising a resilient pad 10 as shown in FIG. 1. An additional layer (not shown) of fabric or other material forms the seating surface, and the resilient pad provides comfort to the user.

Figure 3:
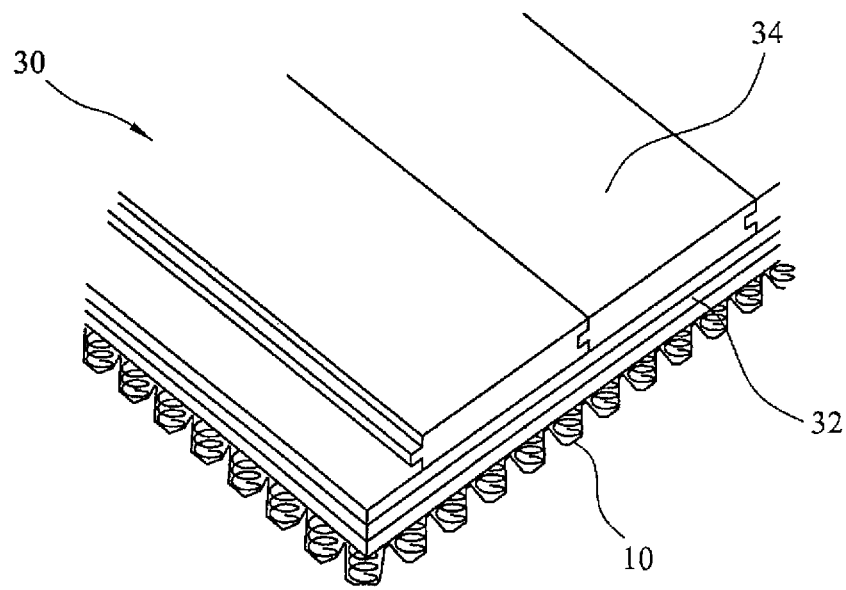
FIG. 3, shows, in schematic part-sectional view, a portion of a floor including a resilient unit in the form of a pad according to an embodiment of the present invention.

FIG. 3 shows in schematic sectional view a portion of a domestic floor, generally at 30, incorporating a resilient pad as shown in FIG. 3. Above the resilient pad 10 is a layer of thermal insulation material 32, and above that are tongue and groove floorboards 34. For different types of floor, such as sports surfaces and exercise mats, the layers 32 and 34 may comprise different materials. Also, the stiffness of the springs 12 can be chosen to suit the intended use.

In both cases the resilient pad provides comfort and support without using foam and with a substantial saving on the amount of metal needed to provide the wire for the springs. The use of springs which have end coils of different diameters enables the unit to be thicker—ie the height of the springs to be greater—as compared with cylindrical springs using the same quantity of material, such as wire. The pad is also free from the noise which often accompanies an array of previously considered springs.

The above examples of resilient pad have a consistent type of pocketed spring throughout. However, the pad need not have pocketed springs that are all the same. The pad can have springs that are arranged in zones, with some areas having springs with one characteristic and others having different springs, for example so that the overall pad has areas with different resilience, where this is useful.

As mentioned above, seat bases and articles of flooring are only two of the possible uses of a resilient pad according to the present invention. Others include, but are not are not limited to: protective clothing or headgear, where a thin pad possibly of different zones of stiffness could be used, tables, beds and packaging.

Whilst endeavouring in the foregoing specification to draw attention to those features of the invention believed to be of particular importance, it should be understood that the applicant claims protection in respect of any patentable feature or combination of features referred to herein, and/or shown in the drawings, whether or not particular emphasis has been placed thereon.

The invention claimed is:

1. A resilient unit suitable for providing comfort, convenience, support or protection, the unit having an upper surface and a lower surface, wherein the upper surface is arranged in use to support a load, the unit comprising a plurality of pocketed coil springs arranged in a substantially planar array, each spring being generally frusto-conical in shape and comprising a plurality of coils that decrease in diameter from a first axial end to a second axial end of the spring, and being substantially encased in one of a plurality of individual pockets, and the unit being compressible in an axial direction of the springs, the axial direction of the springs being substantially perpendicular to a plane of the substantially planar array, wherein the pockets are formed from two axially spaced layers of material, wherein the two layers are joined together at least at locations between the plurality of springs, at a position that is closer to, but not at, the first axial end of the spring, such that the position at which the two layers are joined is a first distance (d) from the upper surface of the resilient unit and a second distance (D) from the bottom surface of the resilient unit that is greater than the first distance, wherein a ratio of the first distance relative to a total distance (d+D) between the upper surface and the lower surface (d/d+D) is in the range between 0.25 and 0.3 inclusively, wherein the first axial ends of the springs are located towards the upper surface of the unit, wherein the unit as a whole is flexible in at least one lateral direction that is generally perpendicular to the axial direction of the springs, and wherein the unit as a whole is at least partially compressible in at least one direction transverse to the axial direction of the springs.

2. The resilient unit according to claim 1, wherein, at least one of the coils in each of the at least two springs having a diameter that is greater than the axial length of the spring within the pocket.

3. The resilient unit according to claim 1, wherein substantially the same quantity of material is arranged to cover each end of the plurality of pocketed coil springs.

4. The resilient unit according to claim 1, wherein each of the at least two springs are held under compression in a respective pocket.

5. The resilient unit according to claim 3, wherein the axially-spaced layers of material are bonded, welded or otherwise attached together at least at the locations between the plurality of springs.

6. The resilient unit according to claim 1, wherein the plurality of springs are of stainless steel or titanium wire.

7. The resilient unit according to claim 1, wherein the unit includes a plurality of zones in which springs from different zones have at least one different characteristic.

8. The resilient unit according to claim 7, wherein the at least one different characteristic comprises at least one of the height and stiffness of the springs.

9. The resilient unit according to claim 1, wherein the unit comprises plural layers of pocketed springs.

10. The resilient unit according to claim 1, wherein the unit includes at least one substrate layer above the plurality of springs.

11. The resilient unit according to claim 10, wherein the at least one substrate layer comprises natural material including one or more of: leather, hemp, wool, silk, cotton, mohair, cashmere, feather, down, and alpaca.

12. A seat comprising the resilient unit according to claim 1.

13. A table comprising the resilient unit according to claim 1.

14. An article of flooring comprising the resilient unit according to claim 1.

15. A protective member, comprising the resilient unit according to claim 1.

16. An article of packaging, comprising the resilient unit according to claim 1.

17. A method of producing a resilient unit suitable for providing comfort, convenience, support or protection, the unit having an upper surface and a lower surface, wherein the upper surface is arranged in use to support a load, the method comprising:

arranging a plurality of coil springs in an array, each spring being frusto-conical in shape and comprising a plurality of coils that decreases in diameter from a first axial end to a second axial end of the spring, and being substantially encased in one of a plurality of individual pockets, and the unit being compressible in an axial direction of the springs, the axial direction of the springs being substantially perpendicular to a plane of the array; and forming the plurality of pockets by joining axially spaced layers of material together at least at locations between the plurality of coil springs, and wherein, the layers of material are joined between the at least two springs at a position that is closer to, but not at, the first axial end of the spring, such that the position at which the two layers are joined is a first distance (d) from the upper surface of the resilient unit and a second distance (D) from the bottom surface of the resilient unit that is greater than the first distance, wherein a ratio of the first distance relative to a total distance (d+D) between the upper surface and the lower surface (d/d+D) is in the range between 0.25 and 0.3 inclusively, wherein the first axial ends of the springs are located towards the upper surface of the unit, and wherein the unit is flexible in at least one lateral direction that is generally perpendicular to the axial direction of the springs and so that the unit is at least partially compressible in at least one direction transverse to the axial direction of the springs.

18. The resilient unit according to claim 1, wherein the unit includes at least one substrate layer below the plurality of springs.

19. The resilient unit according to claim 9, wherein the unit includes at least one substrate layer above the plural layers of pocketed springs.

20. The resilient unit according to claim 9, wherein the unit includes at least one substrate layer below the plural layers of pocketed springs.

21. The resilient unit according to claim 9, wherein the unit includes at least one substrate layer between at least two of the plural layers of pocketed springs.

22. The resilient unit according to claim 1, wherein the plurality of individual pockets are formed from only two layers of material.

23. The resilient unit according to claim 1, wherein the layers of material are joined by a weld that is wider than it is tall.

24. The resilient unit according to claim 23, wherein the weld is substantially flat.

* * * * *